United States Patent Office.

CYRUS K. TAYNTOR, OF CUYLER, NEW YORK.

Letters Patent No. 76,272, dated March 31, 1868.

IMPROVED MEDICAL COMPOUND.

*The Schedule referred to in these Letters Patent and making part of the same.*

TO ALL WHOM IT MAY CONCERN:

Be it known that I, CYRUS K. TAYNTOR, of Cuyler, Cortland county, State of New York, have invented a new and useful Medical Compound for preventing abortion in cows; and I do hereby declare that the following is a full, clear, and exact description of the composition of the same, and of the different ingredients of which it is composed, reference being had to the several ingredients accompanying this application.

My compound is composed of bone-dust (either raw or burned) and sulphate of iron, and is made up of the following proportions: To twenty pounds of bone-dust I add one pound of sulphate of iron. It should be thoroughly mixed, so as to distribute the sulphate of iron equally.

A dose for each cow is from one to two ounces, administered in salt or meal twice in each week. I commence administering it about the middle of September, or as the cows commence drying off in the fall of the year, and continued down to the time of their delivery.

When bone-dust is used in the raw state, it should be made from the bones of a healthy animal, but in a burnt state any bone may be used.

This compound is also useful, and has been used with marked success with cows suffering from weakness and general debility. In such case I mix the compound with an ounce of carroway, either steeped or pulverized, the whole mixed with their food.

I do not intend to limit myself to the use of the two ingredients (bone-dust and sulphate of iron) compounded together, but also to their use when administered separately for the purposes herein set forth. By this I mean that the bone-dust may be administered at one time, and the sulphate of iron at another.

The compound here described has been administered by me with success in a large number of cases, and has been found to accomplish what is here set forth, to wit, the prevention of abortion in cows, and restoring cows suffering from weakness and general debility.

What I claim, and desire to secure by Letters Patent, is—

A medical compound, composed of the ingredients herein set forth, and for the purposes described.

CYRUS K. TAYNTOR.

Witnesses:
NELSON KEELER,
B. B. WOODWORTH.